(12) United States Patent        (10) Patent No.:     US 8,421,288 B2
Tang et al.                      (45) Date of Patent:    Apr. 16, 2013

(54) MOTOR HAVING A SERIAL PORT DISPOSED ON A CONTROL BOARD RECEIVED IN A SCREW HOLE AT THE BOTTOM OF A CONTROL BOX

(75) Inventors: Songfa Tang, Zhongshan (CN); Yong Zhao, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 0 days.

(21) Appl. No.: 13/206,481

(22) Filed: Aug. 9, 2011

(65) Prior Publication Data

US 2011/0291500 A1    Dec. 1, 2011

Related U.S. Application Data

(63) Continuation of application No. PCT/CN2010/070355, filed on Jan. 26, 2010.

(30) Foreign Application Priority Data

Apr. 16, 2009 (CN) ................ 2009 2 0055048 U
Apr. 21, 2009 (CN) ................ 2009 2 0055472 U

(51) Int. Cl.
*H02K 5/00*    (2006.01)
*H02K 9/00*    (2006.01)
*H02K 11/00*   (2006.01)

(52) U.S. Cl.
USPC ............. 310/88; 310/64; 310/68 A; 310/71; 310/89

(58) Field of Classification Search ............ 310/71, 310/68 B, 89, 68, 85, 88; *H02K 5/00*
See application file for complete search history.

(56) References Cited

U.S. PATENT DOCUMENTS

| 3,250,930 | A  | * | 5/1966  | Hackney et al. | 310/71 |
| 3,841,321 | A  | * | 10/1974 | Albach et al. | 601/72 |
| 5,119,466 | A  | * | 6/1992  | Suzuki | 388/831 |
| 6,081,056 | A  | * | 6/2000  | Takagi et al. | 310/89 |
| 6,577,030 | B2 | * | 6/2003  | Tominaga et al. | 310/68 B |
| 6,593,674 | B2 | * | 7/2003  | Sanchez et al. | 310/89 |
| 6,762,521 | B2 | * | 7/2004  | Peter et al. | 310/89 |

FOREIGN PATENT DOCUMENTS

DE    19509130 A1 *  9/1995

OTHER PUBLICATIONS

DE19509130 Machine Translation, EPO, May 15, 2012.*

* cited by examiner

*Primary Examiner* — Tran Nguyen
*Assistant Examiner* — Thomas Truong
(74) *Attorney, Agent, or Firm* — Matthias Scholl P.C.; Matthias Scholl

(57) ABSTRACT

A motor with a body, including: a housing, a stator, and a rotor; and a controller, including a control box, and a control circuit board. The body is disposed at the top of the motor. The controller is disposed at the bottom of the motor. The control circuit board is disposed in the control box. The control box extends from a side of the housing and forms a platform. A control cable and a power line enter the control box via the platform, and are connected to the control circuit board. The control cable and the power line are sealed via a sealing screw joint and a nut.

7 Claims, 7 Drawing Sheets

MOTOR HAVING A SERIAL PORT DISPOSED ON A CONTROL BOARD RECEIVED IN A SCREW HOLE AT THE BOTTOM OF A CONTROL BOX

CROSS-REFERENCE TO RELATED APPLICATIONS

This application is a continuation of International Patent Application No. PCT/CN2010/070355 with an international filing date of Jan. 26, 2010, designating the United States, now pending, and further claims priority benefits to Chinese Patent Application No. 200920055048.7 filed on Apr. 16, 2009, and to Chinese Patent Application No. 200920055472.1 filed on Apr. 21, 2009. The contents of all of the aforementioned applications, including any intervening amendments thereto, are incorporated herein by reference.

BACKGROUND OF THE INVENTION

1. Field of the Invention

The invention relates to a motor.

2. Description of the Related Art

Nowadays, direct current brushless pump motors are widely used in various industries. However, there are several problems with structure of direct current brushless pump motors: 1) since a power line and a control cable extend from side wall of a control box, tightness thereof is not good enough, water drops enter a controller via the cable, and easily cause failure or damage thereof; in addition, leading out wires from the side wall brings great inconvenience for installation and connection; 2) the control circuit board is disposed in the control box, since space is small and the air does not flow therein, heat dissipation is a big problem, since power and heat dissipation of the pump motor are large, temperature raises quickly and becomes very high during operation, which causes that heat is difficult to be dissipated; 3) control functions thereof are comparatively simple, which makes them unable to meet requirements of users; 4) no debug window is disposed on the control box, and connection between a control line or a signal line and a control circuit board is troublesome, parameters of electronic components cannot be adjusted, and an impeller is disposed at a shaft end of the motor, which makes it difficult to fix a rotating shaft during installation, and causes great inconvenience for installation; 5) structure thereof is unreasonable, control thereof is comparatively simple, and no communication interface is left, which makes it inconvenient to communicate with the outside world; and 6) no structure for fastening heat dissipation is disposed at the bottom of the control box.

SUMMARY OF THE INVENTION

In view of the above-described problem, it is an objective of the invention to provide a motor that is capable of addressing the above-mentioned problems.

To achieve the above objectives, in accordance with one embodiment of the invention, provided is a motor, comprising a body, comprising: a housing, a stator, and a rotor, and a controller, comprising a control box, and a control circuit board, the body is disposed at the top of the motor, the controller is disposed at the bottom of the motor, the control circuit board is disposed in the control box, the control box extends from a side of the housing and forms a platform, a control cable and a power line enter the control box via the platform, and are connected to the control circuit board, and the control cable and the power line are sealed via a sealing screw joint and a nut.

In a class of this embodiment, the control circuit board in the controller employs an overlapped structure comprising an upper layer, and a lower layer, the upper layer of the control circuit board is a power board bearing a power conversion circuit, and the lower layer of the control circuit board is a control board bearing a direct current brushless motor control circuit.

In a class of this embodiment, the housing comprises an upper end cover, a metal case with a heat dissipation fin, and a lower end cover, the lower end cover is disposed at the top of the control box and forms a top cover of the control box, the control cable and the power line are connected to the power board via a terminal, and the power board is connected to the control board via the terminal in a manner of insertion.

In a class of this embodiment, an opening is disposed at the bottom of the control box, and operates to receive a LED, the LED is electrically connected to the control board, multiple protruding parts are disposed at the bottom of the control box, and a sealing washer is disposed between the control box and the lower end cover.

In a class of this embodiment, the control cable and the power line are received in the sealing screw joint and the nut, the sealing screw joint is fixed on a lower end cover via the nut, and a lead is in a complete sealing condition.

In a class of this embodiment, a debug window is disposed on side wall or at the bottom of the control box, and a sealing cover is disposed on the debug window.

In a class of this embodiment, a rotary dip switch is disposed at the bottom of the control box, the rotary dip switch is electrically connected to the control board, and the rotary dip switch controls different functions of the motor.

In a class of this embodiment, all heating components on the power board face upwards, a rectifier is tightly attached to a flange on the side wall thereof, an intelligent power module chip IPM on the circuit board is tightly attached to the bottom of the control box, and the control box is made of aluminum.

In a class of this embodiment, a hole is disposed at the bottom of the control box, a serial port disposed on the control board is disposed in the hole, and connected to an external circuit, the hole is a screw hole, and the screw hole is sealed via a plastic nut, and a sealing ring.

Advantages of the invention comprise: the control box extends from the side of the housing and forms the platform, the control cable and the power line enter the control box via the platform, and are electrically connected to the control circuit board, and the control cable and the power line are sealed via a sealing screw joint and a nut, which improves tightness, effectively prevents water drops from enter the controller via the cable, and protects normal operation of the controller; lead-out of the power line and the control cable is reasonable, and brings convenience for wire connection of users.

BRIEF DESCRIPTION OF THE DRAWINGS

Further description of the invention will be given below in conjunction with accompanying drawings, in which.

DETAILED DESCRIPTION OF THE EMBODIMENTS

Further description of the invention will be given below in conjunction with specific embodiments and accompanying drawings.

Figure 1:
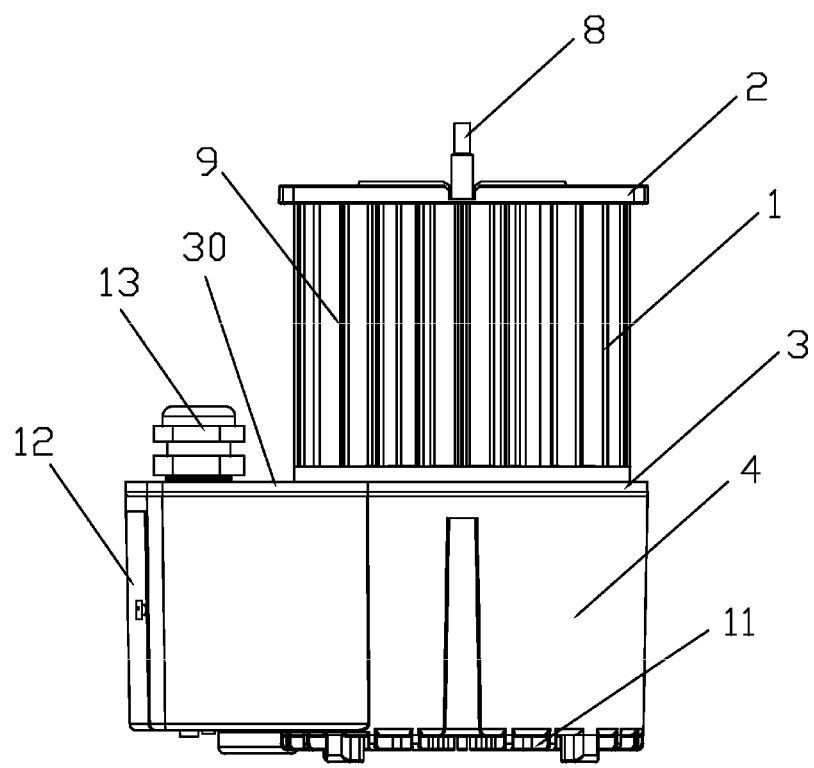
FIG. 1 is a perspective view of the invention.
Figure 2:
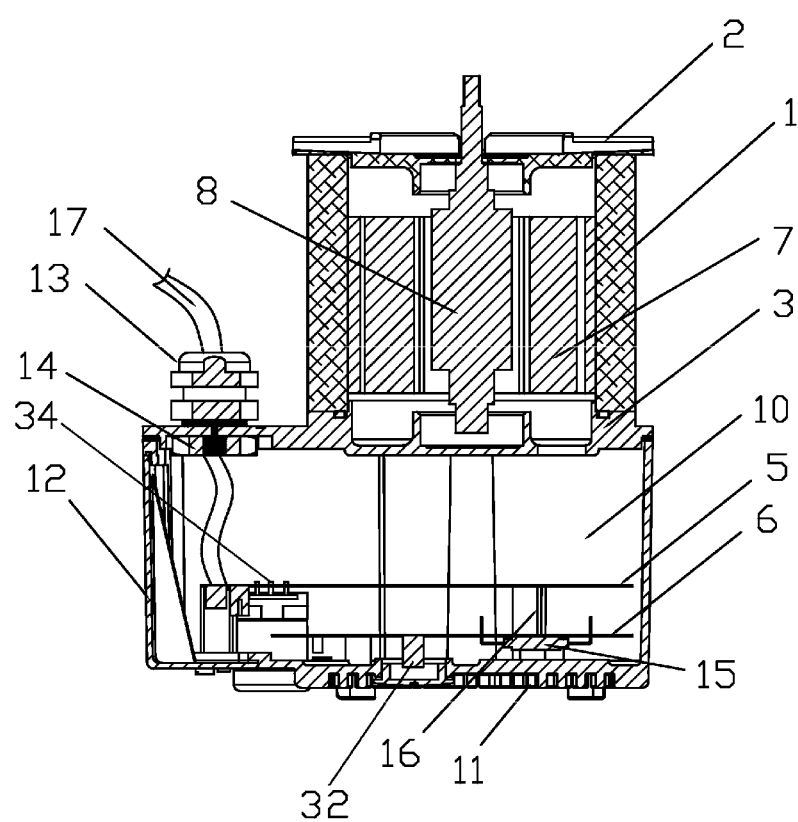
FIG. 2 is a cross-sectional view of the invention.
Figure 3:
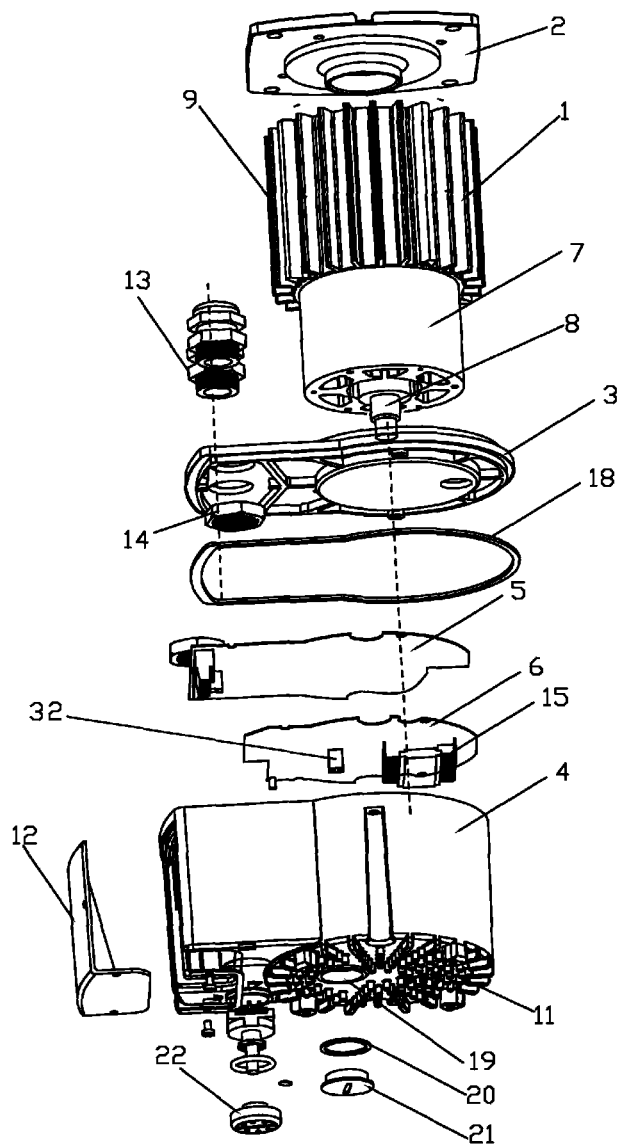
FIG. 3 is an exploded view of the invention.
Figure 4:
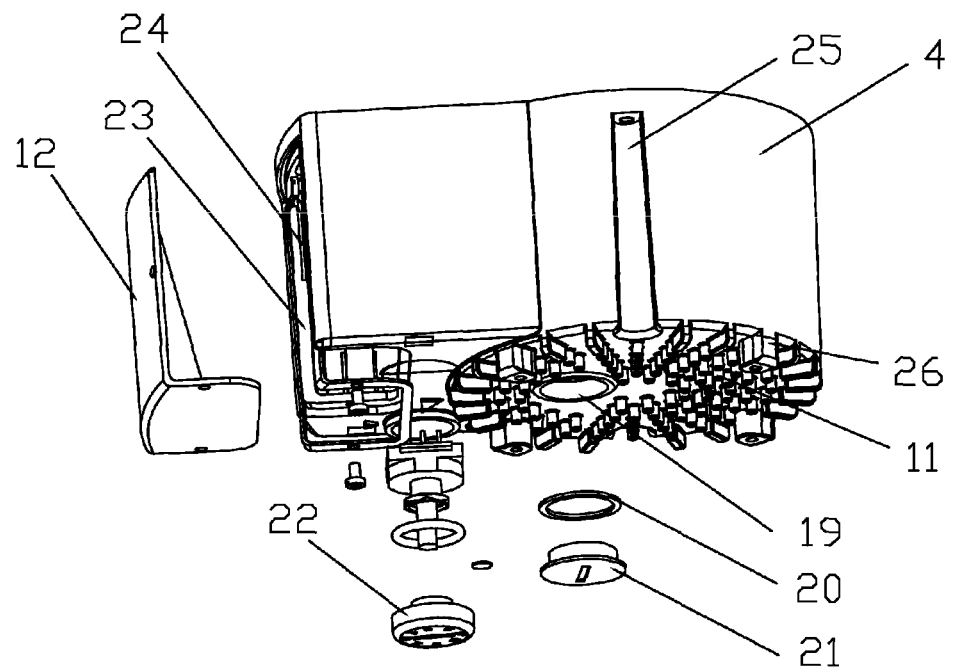
FIG. 4 is a partially enlarged view of a controller of the invention.
Figure 5:
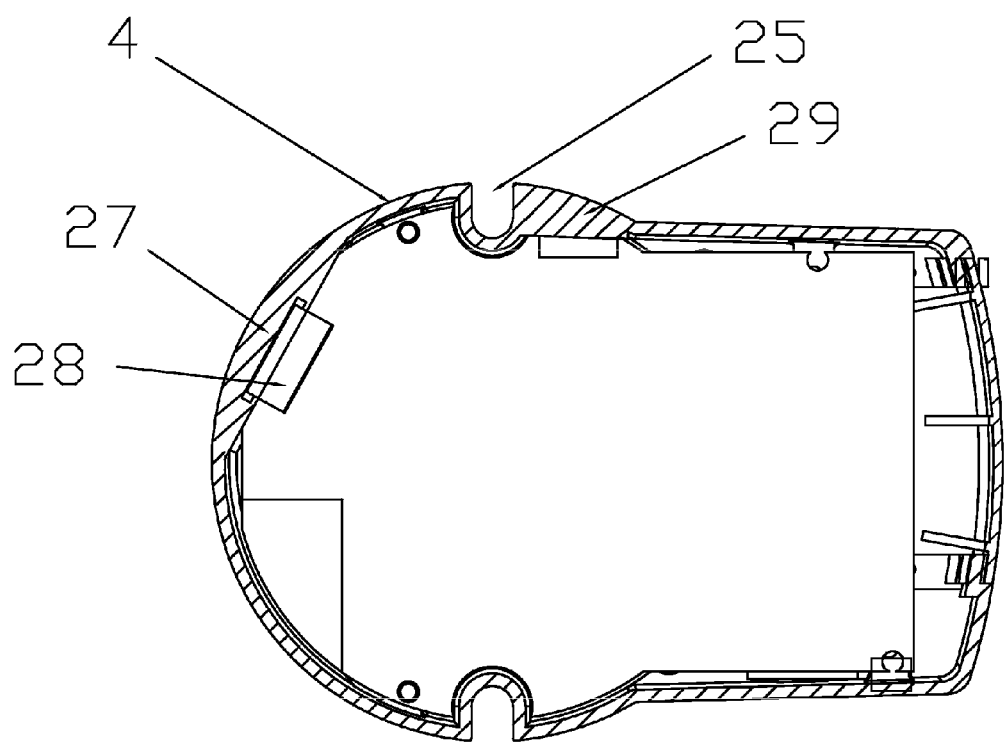
FIG. 5 is a cross-sectional view of a control box of the invention.
Figure 6:
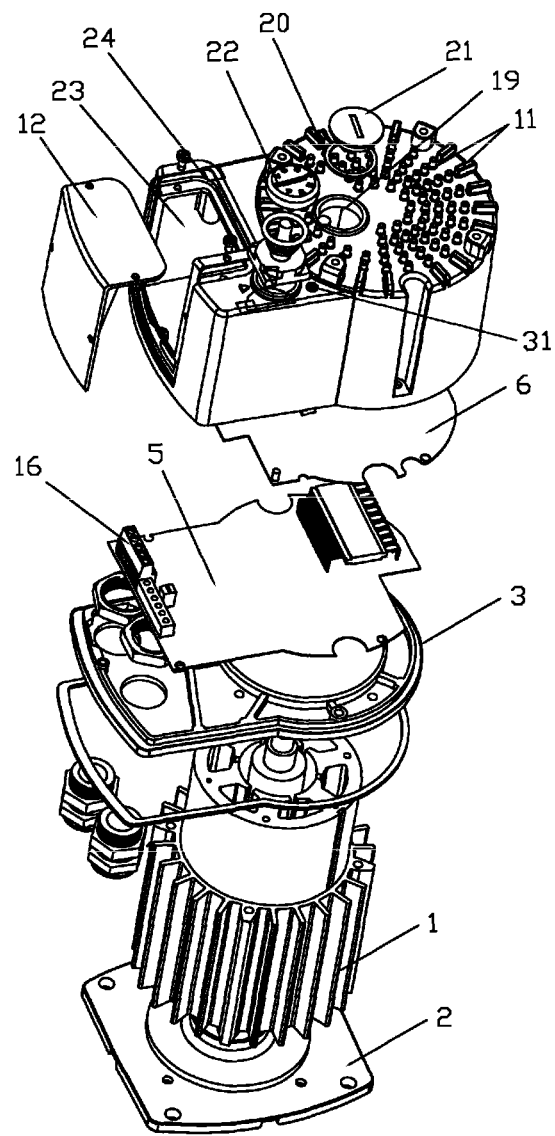
FIG. 6 is an exploded view of the invention from another angle.
Figure 7:
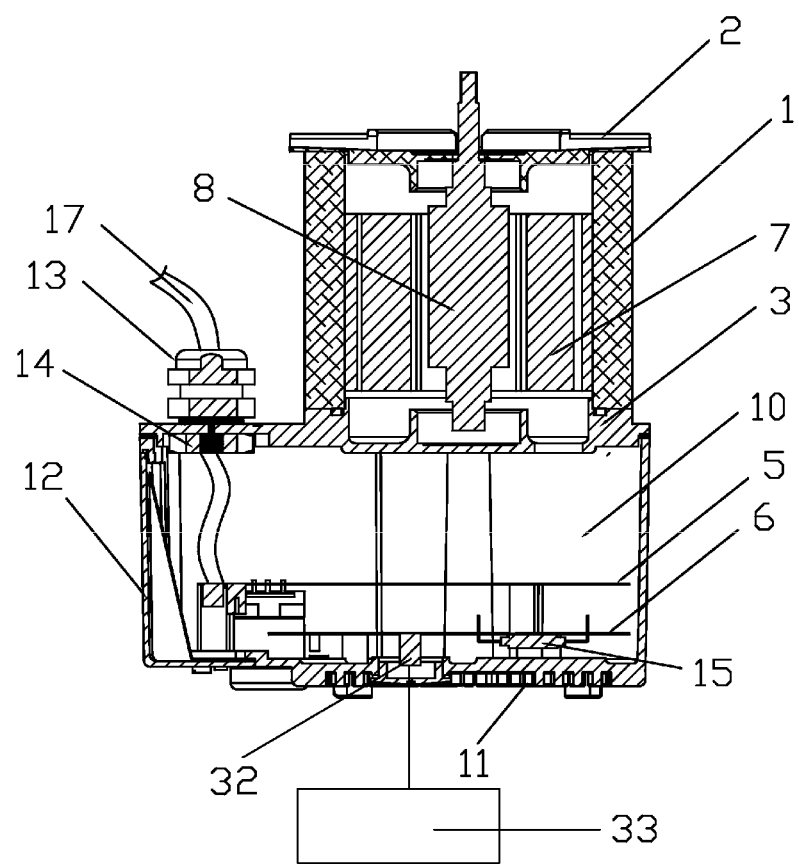
FIG. 7 shows the connection between the control box and the external circuit.

As shown in FIGS. 1-6, a direct current brushless pump motor of the invention comprises a body disposed at the top thereof, and a controller disposed at the bottom thereof. The body comprises a housing, a stator 7, and a rotor 8. The housing comprises an upper end cover 2, a metal case 1 with a heat dissipation fin 9, and a lower end cover 3. The stator 7 and the rotor 8 are disposed in the metal case 1, and the upper end cover 2 and the lower end cover 3 each has a bearing chamber for installing the rotor 8.

A debug window 23 is disposed on side wall or at the bottom of the control box 4, a sealing cover 12 is disposed on the debug window 23, the sealing cover 12 can be opened, and the control circuit board can be exposed for wire connection, adjustment of parameters of electronic components, and fixation of a rotating shaft according to requirements of users for installation and use. A sealing pad 24 is disposed between the sealing cover 12 and the control box 4.

The controller comprises a control box 4, and a control circuit board disposed in the control box 4. The control circuit board in the controller employs an overlapped structure comprising an upper layer, and a lower layer, the upper layer of the control circuit board is a power board 5 bearing a power conversion circuit, and the lower layer of the control circuit board is a control board 6 bearing a direct current brushless motor control circuit. The lower end cover 3 is disposed at the top of the control box 4 whereby forming a top cover for the control box 4. Part of the control box 4 and that of the lower end cover 3 extend from a side of the metal case and form a platform 30, a control cable and a power line 17 enters the control box via the platform, and is electrically connected to the power board 5, and the power board 5 is connected to the control board 6 via a terminal 16 in a manner of insertion. The control cable and the power line 17 are led out from the platform via a sealing screw joint 13 and a nut 14, the sealing screw joint 13 is fixed on the lower end cover 3 via the nut 14, and a lead is in a complete sealing condition. A rotary dip switch 22 is disposed at the bottom of the control box 4, the rotary dip switch 22 is electrically connected to a lower-layer control board 6, and the rotary dip switch 22 controls different functions of the motor. All heating components 34 on the power board 5 face upwards, a rectifier 28 is tightly attached to a flange 27 on the side wall, an intelligent power module chip 15 on the control board 6 is tightly attached to the bottom of the control box 4, and the control box is made of aluminum, which features fast heat dissipation. A hole 19 is disposed at the bottom of the control box 4, a serial port 32 disposed on the control board 6 is disposed in the hole, and connected to an external circuit 33, the hole 19 is a screw hole, and the screw hole is sealed via a plastic nut 21, and a sealing ring 20. The upper end cover 2 and the lower end cover 3 are aluminum casting end covers, and the metal case 1 is an expanding aluminum case. An opening is disposed at the bottom of the control box 4, and operates to receive a LED 31, the LED 31 is electrically connected to the control board, multiple protruding parts 11 are disposed at the bottom of the control box 4, and a sealing washer 18 is disposed between the control box 4 and the lower end cover 3, and operates to solve a waterproof and dustproof problem.

If a plastic cover 12 of the debug window 23 on the side wall of the control box 4 is opened, a socket for a power line, and that for a control cable are exposed, and a control cable and a power line 17 can be connected thereto. The power line 17 is led out from the sealing screw joint 13 on the lower end cover 3, the sealing screw joint 13 is fixed on the lower end cover 3 via the nut 14, and the lead is in a complete sealing condition.

A groove 25 is disposed on one side of the control box 4, and another protruding part 29 is disposed on the control box 4, and operates to attach surface of overheated electronic components to the protruding part 29 whereby speeding up heat dissipation. A mounting foot 26 is disposed at the bottom of the control box 4, and multiple steps extend from inner side wall of the control box 4 and operate to support the control board 6 and the power board 5. A screw hole is disposed on top end surface of the step, and operates to fix the control board 6 and the power board 5 via a screw.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor comprising:
   a body, comprising a housing, a stator, and a rotor; and
   a controller, comprising a control box and a control circuit board;
   wherein:
   said body is disposed at the top of the motor;
   said controller is disposed at the bottom of the motor;
   said control circuit board is disposed in said control box;
   said control box extends from a side of said housing and forms a platform;
   a control cable and a power line enter said control box via said platform, and are connected to said control circuit board;
   said control cable and said power line are sealed via a sealing screw joint and a nut;
   said control circuit board in said controller employs an overlapped structure comprising an upper layer and a lower layer;
   said upper layer of said control circuit board is a power board bearing a power conversion circuit;
   said lower layer of said control circuit board is a control board bearing a direct current brushless motor control circuit;
   a hole is disposed at the bottom of said control box;
   a serial port disposed on said control board is disposed in said hole, and connected to an external circuit;
   said hole is a screw hole; and
   said screw hole is sealed via a plastic nut and a sealing ring.

2. The motor of claim 1, wherein:
   said housing comprises an upper end cover, a metal case with a heat dissipation fin, and a lower end cover;
   said lower end cover is disposed at the top of said control box forming a top cover of said control box;
   said control cable and said power line are electrically connected to said power board; and
   said power board is connected to said control board via a terminal in a manner of insertion.

3. The motor of claim 2, wherein:
an opening is disposed at the bottom of said control box and operates to receive a LED;
said LED is electrically connected to said control board;
multiple protruding parts are disposed at the bottom of said control box; and
a sealing washer is disposed between said control box and said lower end cover.

4. The motor of claim 3, wherein:
said control cable and said power line are received in said sealing screw joint and said nut;
said sealing screw joint is fixed on a lower end cover via said nut; and
a lead is in a complete sealing condition.

5. The motor of claim 1, wherein a debug window is disposed on a side wall of said control box; and a sealing cover is disposed on said debug window, whereby said control box can be exposed for wire connection, adjustment of parameters of electronic components, and fixation of a rotating shaft according to requirements of users for installation and use.

6. The motor of claim 1, wherein:
a rotary dip switch is disposed at the bottom of said control box;
said rotary dip switch is electrically connected to said control board; and
said rotary dip switch controls different functions of the motor.

7. The motor of claim 6, wherein:
all heating components on said power board face upwards;
a rectifier is tightly attached to a flange on a side wall thereof;
an intelligent power module chip IPM on said circuit board is tightly attached to the bottom of said control box; and
said control box is made of aluminum.

* * * * *